2,928,806
Patented Mar. 15, 1960

2,928,806

COPOLYMERS OF ORGANIC SILICON COMPOUNDS AND ACRYLONITRILE

Donald L. Bailey, Snyder, and Ronald M. Pike, Grand Island, N.Y., assignors to Union Carbide Corporation, a corporation of New York No Drawing. Application March 27, 1956
Serial No. 574,086

12 Claims. (Cl. 260—46.5)

This invention relates to polysiloxanes. More particularly, this invention is directed to copolymers of mono-vinyl siloxanes and acrylonitrile as new compositions of matter and to a process for producing the same.

Copolymers of unsaturated organic compounds and a number of unsaturated silicon-containing compounds have been suggested. For the most part those suggestions involve the copolymerization of an unsaturated organic compound with either a simple olefinic silane or a polysiloxane containing a plurality of unsaturated groups. Copolymers of the above type are characterized by their stability against decomposition at elevated temperatures and thus have advantages over those polymers or copolymers derived from purely organic materials. However, such copolymers have not met with wide acceptance as they are not suitable for a wide variety of applications. By way of illustration, difficulty is encountered in obtaining a silicone copolymer in a soluble form so that a solution of it can be applied to a surface and the solvent evaporated to form a coating of the copolymer on the surface.

The present invention is based on our discovery that thermally stable silicon-containing copolymers, which are soluble in various liquid organic compounds, can be produced by copolymerizing a mono-vinyl siloxane with an olefinic nitrile. More specifically, we have found that useful copolymers can be produced by copolymerizing a mono-vinyl methylsiloxane with acrylonitrile.

The copolymers of our invention can be produced by forming a mixture of a mono-vinyl methylsiloxane and acrylonitrile and heating the mixture in the presence of a catalyst to a temperature sufficiently elevated to cause the starting materials to react to produce the copolymer.

The mono-vinyl methylsiloxanes which we prefer to employ as one of the starting materials in our process can be graphically represented by the formula:

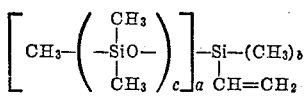

wherein $a$, $b$ and $c$ are integers with $a$ having a value of from 1 to 3, $b$ having a value of from 0 to 2, $c$ having a value of from 1 to 6, with the sum of $a$ and $b$ being equal to 3, the product of $a$ and $c$ having a value of from 1 to 6 and there are up to 7 silicon atoms in the molecule. Illustrative of these mono-vinyl methylsiloxanes we can employ are: tris(trimethylsiloxy)vinylsilane, bis(trimethylsiloxy)methylvinylsilane, trimethylsiloxydimethylvinylsilane, and the like.

Our preferred mono-vinyl methylsiloxane starting materials can be produced by heating a mixture of a methylsiloxy substituted silane which contains only one hydrogen atom bonded directly to silicon, acetylene and a catalyst to a temperature sufficiently elevated to cause the starting materials to react to produce a mono-vinyl methylsiloxane. By way of illustration, bis(trimethylsiloxy)methylvinylsilane is produced by heating bis-(trimethylsiloxy)methylsilane with acetylene in the presence of platinum as catalyst to a temperature sufficiently elevated to cause the acetylene and substituted silane to react. Processes for producing mono-vinyl methylsiloxanes useful as starting materials in the present invention are described and claimed in copending United States patent applications Serial Nos. 544,033, 547,087, now abandoned and 574,104, now abandoned.

Our preferred mono-vinyl methylsiloxane starting materials are linear compounds such as correspond to graphical Formula 1 above. However, mono-vinyl cyclic methylsiloxanes are also useful in producing our copolymers. Thus we may copolymerize acrylonitrile with such mono-vinyl cyclic methylsiloxanes as vinylpentamethylcyclotrisiloxane, vinylheptamethylcyclotetrasiloxane, vinylnonamethylcyclopentasiloxane and the like according to the process of our invention to produce our copolymers.

The polymerization temperatures which we can employ in our process are not narrowly critical and can vary over a wide range. We can employ temperatures as low as 30° C. and as high as 60° C. and above; however, we prefer to employ a temperature of from about 45° C. to about 55° C. Temperatures above and below the suggested ranges can also be employed; however, no commensurate advantage is obtained thereby.

As catalysts for our process, we can employ any of the compounds employed in vinyl-type polymerization reactions. By way of illustration we can employ organic peroxides such as the alkyl and aryl peroxides including tertiary butyl peroxide, benzoyl peroxide and the like; organic azo compounds such as alpha, alpha'-azodiisobutyronitrile and the like; and ultra-violet light.

The amount of catalyst employed in our process is not narrowly critical. We can employ the catalyst in amounts of from as little as about 0.02 percent up to about 2.5 percent by weight of the starting materials. However, we prefer to employ the catalyst in an amount of from about 0.5 to about 1.5 percent by weight of the starting materials. Amounts of the catalyst outside of the wider range disclosed above can also be employed; however, no commensurate advantage is obtained thereby.

One way of carrying out the copolymerization of the mono-vinyl methylsiloxane and acrylonitrile is to charge these starting compounds together with a catalyst into a closed vessel and to heat the resulting mixture to the temperature at which they will react to produce the copolymer. If desired, the reaction can be conducted in an inert atmosphere to minimize undesirable side reactions, and/or inhibition of the reaction due to atmospheric oxygen. Protection of the reactants can be accomplished by adding the starting materials and catalyst to a closed vessel and charging an inert gas such as argon, nitrogen or the like thereto.

To obtain good reactive contact between the molecules of the starting materials we can carry out our process by first dissolving the mono-vinyl methylsiloxane and acrylonitrile in a suitable liquid organic compound, preferably one in which the reactants are completely soluble, adding the catalyst to the solution and heating the mixture to a temperature at which reaction occurs. Illustrative of the liquid organic compounds in which the starting materials of our process are completely soluble are the aromatic hydrocarbons such as toluene, xylene and the like. The amount of the liquid organic compound employed is not narrowly critical. In our work we have found that an amount of the liquid organic compound equal in weight to the combined weight of the reactants can be employed with good results. Our process can be also carried out by adding the starting materials to a liquid organic compound or aqueous admixture in which they are not soluble, but in which they can be finely dispersed as in the form of an emulsion, adding the catalyst and heating the mixture to the reaction temperature.

The mono-vinyl methylsiloxane and acrylonitrile starting materials can be employed in our process in varying amounts depending upon the desired content of combined mono-vinyl methylsiloxane or combined acrylonitrile in the copolymer. Thus, amounts of the mono-vinyl methylsiloxane of from as little as about 5 percent to as high as about 99 percent by weight and amounts of acrylonitrile of from about 95 percent to about 1 percent by weight of the total weight of the reactants can be employed. We prefer to employ the mono-vinyl methylsiloxane in an amount of from about 10 percent to about 50 percent by weight and acrylonitrile in an amount of from about 90 percent to about 50 percent by weight of the total weight of the reactants.

The rate at which our copolymerization reaction occurs was found to decrease continually with increasing mono-vinyl siloxane concentration in the reaction mixture. Owing to this decrease in reaction rate we prefer to conduct our copolymerization reaction using a concentration of the mono-vinyl siloxane of no greater than 50% by weight of the reactants.

Starting with given amounts of the reactants, the composition of the copolymer resulting from our process can be approximately determined by the equation below developed by T. Alfrey, Jr., J. Bohrer and H. Mark appearing in the text "High Polymers," volume VIII, "Copolymerization," published by Interscience Publishers, Inc., New York, New York, 1952, which relates monomer and polymer compositions with the reactivities of the monomers involved.

$$\frac{m_1}{m_2}=\frac{M_1}{M_2}\frac{r_1M_1+M_2}{r_2M_2+M_1}$$

where:

$M_1$ and $M_2$ are mole fractions of monomer in the monomer mixture.

$m_1$ and $m_2$ are mole fractions of monomer in the copolymer.

$r_1$ and $r_2$ are reactivity ratios which relate the relative rates of the propagation reactions involved.

The reactivity ratios $r_1$ and $r_2$ can be further defined by $$r_1=\frac{k_{11}}{k_{12}} \text{ and } r_2=\frac{k_{22}}{k_{21}}$$

where:

$k_{11}$ and $k_{12}$ are rate constants for reaction of $M_1$ with growing polymer radicals terminated with $m_1$ and $m_2$, respectively.

$k_{21}$ and $k_{22}$ are rate constants for reaction of $M_2$ with growing polymer radicals terminated with $m_1$ and $m_2$, respectively.

In our system acrylonitrile is relatively more reactive than our starting mono-vinyl siloxane, the former compound having a reactivity ratio of about 8 as compared with a reactivity ratio of about 0.1 for the mono-vinyl methylsiloxane. Equal amounts by weight of acrylonitrile and a mono-vinyl methylsiloxane copolymerized in accordance with our process yield a copolymer which contains a smaller amount of the combined mono-vinyl methylsiloxane than of the combined acrylonitrile. The relative amount of the combined mono-vinyl siloxane in the copolymer can be increased by increasing the concentration of the mono-vinyl siloxane in the reaction mixture and in this manner the lower reactivity of the mono-vinyl siloxane can be compensated for. For example, in the above illustration where equal amounts by weight of the starting materials are copolymerized the combined mono-vinyl methylsiloxane content of the copolymer could be increased by increasing the concentration of mono-vinyl methylsiloxane in the initial reaction mixture. However, as indicated above, an increased initial concentration of the mono-vinyl siloxane compound over and above about 50 percent by weight of the reactants decreases the rate of the reaction to a low value.

One method of increasing the siloxane content of the copolymers of our invention, other than by employing large amounts of the mono-vinyl methylsiloxanes in the initial reaction mixture, includes the steps of producing a copolymer from the starting materials under conditions which insure a rapid rate of reaction and subsequently equilibrating the copolymer with a methylpolysiloxane. Such equilibration reactions can be caused to take place between or among compounds containing silicon to oxygen to silicon linkages and are carried out by heating the compounds, in the presence of an acidic or basic catalyst, to a temperature at which the reaction will occur. There results or is produced by such equilibration reactions a copolymer having a structure similar to that of the initial copolymer with the exception that the pendant siloxane groups have additional methylsiloxy units.

Illustrative of the methylpolysiloxanes which can be equilibrated with the copolymers of our invention to increase the siloxane content thereof are such compounds having more than two consecutive silicon to oxygen to silicon bonds as hexamethylcyclotrisiloxane, octamethylcyclotetrasiloxane, octamethyltrisiloxane, dimethylpolysiloxanes, and the like.

As catalysts for the equilibration reaction we can employ both acidic and basic catalysts. Illustrative of suitable basic catalysts are sodium hydroxide, potassium hydroxide, potassium dimethylsilanolate and the ilke, while sulfuric acid is typical of the suitable acidic catalysts.

In carrying out the equilibration reaction, the starting mono-vinyl methylsiloxane-acrylonitrile copolymer and methylpolysilane are preferably added to a suitable liquid organic compound in which they are completely soluble. Suitable liquid organic compounds in which the starting materials are completely soluble are the aromatic hydrocarbons such as toluene, xylene and the like.

The copolymers or our invention can be regarded as molecules having long carbon chains with pendant hydrogen atoms, nitrile groups and methylsiloxane groups. Such copolymers can have a structure of alternating combined mono-vinyl methylsiloxane-acrylonitrile units, which, when the mino-vinyl methylsiloxane is tris(trimethylsiloxy)vinylsilane can be graphically represented by the unit:

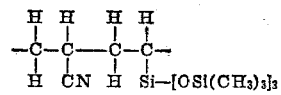

or the copolymer can comprise constituent molecules having alternating blocks of two or more combined acrylonitrile units linked to blocks of two or more combined tris(trimethylsiloxy)vinylsilane units as graphically represented by the formula:

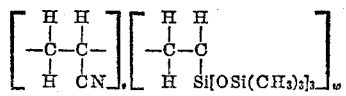

or they can comprise molecules having a structure including both types of units disclosed above which can be graphically represented by the formula:

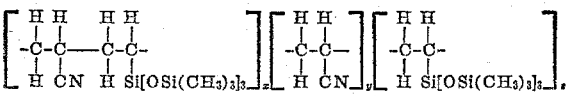

where $v$, $w$, $x$, $y$ and $z$ are integers.

Our preferred copolymers contain from about 1 percent to about 60 percent by weight of combined mono-vinyl siloxane. Such polymers are particularly useful as clear coatings especially in those applications where thermal stability is required up to a temperature of about 240° C. These coatings can be cold drawn. Our copolymers can also be formed into fibrous materials.

One property that our copolymers possess and that makes them particularly suitable for use as coatings is that they are soluble in various liquid organic compounds such as dialkylformamides. Thus, solutions thereof can be readily prepared and the polymers applied in this form to surfaces to be coated by means of a spray. The copolymers of our invention can also be employed as modifying agents with polyacrylonitrile homopolymers to improve their heat and dimensional stability and solvent resistance and as additives to silicone rubber.

The following examples are illustrative of our invention:

Example I

In a twelve inch Pyrex tube which had a partially constricted neck and which had been flushed with argon was placed tris(trimethylsiloxy)vinylsilane (3.0 grams), freshly distilled acrylonitrile (7.0 grams), acetyl peroxide (1.0 gram as a 25% solution in dimethylphthalate) and acetone (10 milliliters). The tube was sealed under argon and rotated in a water bath at 50°±2° C. for a period of 1.25 hours. A white precipitate formed in the Pyrex tube. The precipitate and reaction solution were poured into 500 cubic centimeters of isopropyl alcohol. The precipitate was removed from the solution by filtration, washed with 250 cubic centimeters of isopropyl alcohol and dried in a constant temperature oven for 14 hours at 65° C. Analysis showed that the dried precipitate contained 2.1% silicon by weight which corresponds to 6.06% combined siloxane by weight. This analysis together with the rate of copolymerization curves and the calculated reactivity ratios proved that the precipitate was a copolymer of tris(trimethylsiloxy)vinylsilane and acrylonitrile.

Example II

Using a procedure similar to that outlined in Example I, the following copolymers of tris(trimethylsiloxy)vinylsilane and acrylonitrile were produced:

| Run | Percent by Weight of Tris(trimethylsiloxy)vinylsilane in Reaction Mixture | Percent by Weight of combined Tris(trimethylsiloxy)vinylsilane in Copolymer |
| --- | --- | --- |
| 1 | 10 | 2.3 |
| 2 | 30 | 6.06 |
| 3 | 50 | 10.60 |
| 4 | 70 | 16.10 |
| 5 | 80 | 56.80 |

These copolymers were soluble in dimethylformamide. They started to turn yellow at about 240° C., began to decompose at about 300° C. and did not melt up to about 350° C.

Example III

Using a procedure similar to that outlined in Example I, the following copolymers of bis(trimethylsiloxy)methylvinylsilane and acrylonitrile were produced:

| Run | Percent by Weight of Bis(trimethylsiloxy)methylvinylsilane in Reaction Mixture | Percent by Weight of combined Bis(trimethylsiloxy)methylvinylsilane in Copolymer |
| --- | --- | --- |
| 1 | 10 | 1.57 |
| 2 | 20 | 8.00 |
| 3 | 30 | 8.30 |
| 4 | 50 | 10.00 |
| 5 | 70 | 13.31 |
| 6 | 80 | 26.0 |

The copolymers produced in runs 1, 2, 3 and 5 started to turn yellow at about 240° C., turned brown and began to decompose at about 300° C. and did not melt up to about 350° C.

Example IV

Using a procedure similar to that outlined in Example I, the following copolymers of trimethylsiloxydimethylvinylsilane and acrylonitrile were produced:

| Run | Percent by Weight of Trimethylsiloxydimethylvinylsilane in Reaction Mixture | Percent by Weight of combined Trimethylsiloxydimethylvinylsilane in Copolymer |
| --- | --- | --- |
| 1 | 10 | 4.67 |
| 2 | 30 | 8.10 |
| 3 | 50 | 11.90 |
| 4 | 70 | 21.2 |

The copolymers produced in runs 1, 2 and 3 started to turn yellow at about 240° C., began to decompose at about 280° C. and did not melt up to about 350° C.

Example V

A homopolymer of acrylonitrile was produced using a procedure similar to that outlined in Example I. This homopolymer started to turn yellow at about 130° C. and decomposed rapidly between about 200° C. and about 300° C.

Example VI

A one gram sample of a tris(trimethylsiloxy)vinylsilane-acrylonitrile copolymer that contained 12.4% by weight of the combined silane was dissolved in 20 milliliters of dimethylformamide. This solution was concentrated under reduced pressure at room temperature to produce a viscous oily solution. A film was prepared from this solution by pouring it on a glass slide and allowing the remaining solvent to evaporate. The resulting film was clear and fairly tough and could be cold drawn. The film was approximately 0.0023 inch thick.

What is claimed is:

1. A copolymer of acrylonitrile and a mono-vinyl siloxane, said siloxane having the graphical formula:

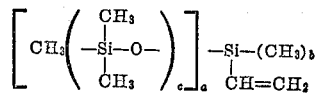

wherein:
(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, the molecules of said copolymer containing from about 1 percent to about 60 percent by weight of combined mono-vinyl siloxane and being composed of carbon chains with pendant hydrogen atoms, nitrile groups and methylsiloxane groups.

2. A copolymer of acrylonitrile and trimethylsiloxydimethylvinylsilane, the molecules of said copolymer containing from about 1 percent to about 60 percent by weight of combined trimethylsiloxydimethylvinylsilane and being composed of carbon chains with pendant hydrogen atoms, nitrile groups and trimethylsiloxydimethylsilyl groups.

3. A copolymer of acrylonitrile and bis(trimethylsiloxy)methylvinylsilane, the molecules of said copolymer containing from about 1 percent to about 60 percent by weight of combined bis(trimethylsiloxy)methylvinylsilane and being composed of carbon chains with pendant hydrogen atoms, nitrile groups and bis(trimethylsiloxy)methylsilyl groups.

4. A copolymer of acrylonitrile and tris(trimethylsiloxy)vinylsilane, the molecules of said copolymer containing from about 1 percent to about 60 percent by weight of combined tris(trimethylsiloxy)vinylsilane and being composed of carbon chains with pendant hydrogen atoms, nitrile groups and tris(trimethylsiloxy)silyl groups.

5. A process for producing a copolymer composed of carbon chains having pendant hydrogen atoms, nitrile groups and methylsiloxane groups, comprising forming a mixture of acrylonitrile, a mono-vinyl siloxane and a vinyl polymerization catalyst, said mixture containing said siloxane in an amount of from about 5% to about 99% by weight of the total weight of said siloxane and said acrylonitrile, said mono-vinyl siloxane having the graphical formula

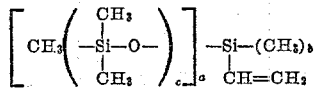

wherein:

(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and acrylonitrile to react to produce the copolymer.

6. A process for producing a copolymer composed of carbon chains having pendant hydrogen atoms, nitrile groups and methylsiloxane groups, comprising forming a mixture of acrylonitrile, a mono-vinyl siloxane and a vinyl polymerization catalyst, said mixture containing said siloxane in an amount of from about 10% to about 50% by weight of the total weight of said siloxane and said acrylonitrile, said mono-vinyl siloxane having the formula

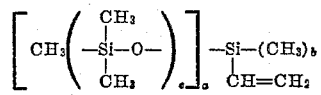

wherein:

(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule, and heating the mixture to a temperature sufficiently elevated to cause the siloxane and acrylonitrile to react to produce the copolymer.

7. A process as defined in claim 5, wherein said mono-vinyl siloxane is trimethylsiloxydimethylvinylsilane.

8. A process as defined in claim 6, wherein said mono-vinyl siloxane is trimethylsiloxydimethylvinylsilane.

9. A process as defined in claim 5, wherein said mono-vinyl siloxane is bis(trimethylsiloxy)methylvinylsilane.

10. A process as defined in claim 6, wherein said mono-vinyl siloxane is bis(trimethylsiloxy)methylvinylsilane.

11. A process as defined in claim 5, wherein said mono-vinyl siloxane is tris(trimethylsiloxy)vinylsilane.

12. A process as defined in claim 6, wherein said mono-vinyl siloxane is tris(trimethylsiloxy)vinylsilane.

References Cited in the file of this patent

UNITED STATES PATENTS

| | | |
|---|---|---|
| 2,480,822 | Hyde | Sept. 6, 1949 |
| 2,532,583 | Tyran | Dec. 5, 1950 |
| 2,645,628 | Hurd | July 14, 1953 |
| 2,716,638 | Cohen et al. | Aug. 30, 1955 |
| 2,756,246 | Burkhard | July 24, 1956 |

OTHER REFERENCES

Rochow: Chemistry of the Silicones, 2nd ed., 1951, page 83ff, publ. by John Wiley & Sons, Inc., New York.